United States Patent
Hom et al.

(10) Patent No.: US 9,219,739 B2
(45) Date of Patent: Dec. 22, 2015

(54) REPUTATION BASED ACCESS CONTROL

(71) Applicant: International Business Machines Corporation, Armonk, NY (US)

(72) Inventors: Richard V. Hom, Troy, MI (US); David C. Roxin, Pikesville, MD (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/641,501

(22) Filed: Mar. 9, 2015

(65) Prior Publication Data

US 2015/0188926 A1 Jul. 2, 2015

Related U.S. Application Data

(63) Continuation of application No. 14/315,397, filed on Jun. 26, 2014, now Pat. No. 9,047,336, and a continuation of application No. 12/775,410, filed on May 6, 2010, now Pat. No. 8,805,881.

(51) Int. Cl.
| | |
|---|---|
| *G06F 17/30* | (2006.01) |
| *H04L 29/06* | (2006.01) |
| *G06F 21/55* | (2013.01) |
| *G06F 21/62* | (2013.01) |

(52) U.S. Cl.
CPC ........ *H04L 63/102* (2013.01); *G06F 17/30386* (2013.01); *G06F 21/552* (2013.01); *G06F 21/554* (2013.01); *G06F 21/6218* (2013.01); *H04L 63/08* (2013.01); *H04L 63/20* (2013.01); *G06F 2221/2101* (2013.01); *G06F 2221/2103* (2013.01); *G06F 2221/2141* (2013.01)

(58) Field of Classification Search
CPC . H04L 29/06823; H04L 63/102; H04L 63/08; H04L 63/20
See application file for complete search history.

(56) References Cited

U.S. PATENT DOCUMENTS

| | | |
|---|---|---|
| 6,615,253 B1 | 9/2003 | Bowman-Amuah |
| 6,766,314 B2 | 7/2004 | Burnett |
| 7,552,110 B2 | 6/2009 | Hrle et al. |

(Continued)

OTHER PUBLICATIONS

Aram Galstyan & Paul Cohen, "Is Guilt by Association a Bad Thing?", Feb. 15, 2005, First International Conference on Intelligence Analysis, 6 pages.*

(Continued)

*Primary Examiner* — Scott A Waldron
(74) *Attorney, Agent, or Firm* — John R. Pivnichny; Maxine L. Barasch; Keohane & D'Alessandro PLLC

(57) ABSTRACT

Approaches for providing reputation based access control are provided. Specifically, at least one approach includes: identifying a requesting subject requesting access to a controlled resource; retrieving a reputation of the subject stored as a virtual attribute in a reputation-based access control database, the reputation comprising a value for skill for operating with the requested controlled resource; determining whether the subject is a known security risk; modifying a reputation of the subject and an associate in the case that a security risk of the subject meets a threshold; modifying the reputation of the subject based on at least one of: peer feedback and expert opinion, in the case that the subject is not a known security risk; retrieving a policy of the requested controlled resource; determining if the reputation of the subject meets the policy, and if so, allowing the subject access to the resource, and if not, denying the access.

20 Claims, 5 Drawing Sheets

(56) References Cited

U.S. PATENT DOCUMENTS

| | | | |
|---|---|---|---|
| 7,568,097 | B2 | 7/2009 | Burnett |
| 7,698,255 | B2 | 4/2010 | Goodwin et al. |
| 7,698,303 | B2 | 4/2010 | Goodwin et al. |
| 8,021,163 | B2 | 9/2011 | Forman |
| 8,359,328 | B2 | 1/2013 | Hom et al. |
| 8,805,881 | B2 | 8/2014 | Hom et al. |
| 9,047,336 | B2 * | 6/2015 | Hom et al. ............ 1/1 |
| 2002/0147706 | A1 | 10/2002 | Burnett |
| 2003/0083891 | A1 | 5/2003 | Lang et al. |
| 2005/0005079 | A1 | 1/2005 | Boudou et al. |
| 2006/0212931 | A1 | 9/2006 | Shull et al. |
| 2007/0006326 | A1 | 1/2007 | Redlich et al. |
| 2007/0101436 | A1 | 5/2007 | Redlich et al. |
| 2008/0005223 | A1 | 1/2008 | Flake et al. |
| 2008/0183538 | A1 | 7/2008 | Hamadi et al. |
| 2008/0183700 | A1 | 7/2008 | Gabriel et al. |
| 2009/0024574 | A1 | 1/2009 | Timmons |
| 2009/0204471 | A1 | 8/2009 | Elenbaas et al. |
| 2009/0265551 | A1 | 10/2009 | Tripunitara et al. |
| 2009/0300720 | A1 | 12/2009 | Guo et al. |
| 2010/0077445 | A1 | 3/2010 | Schneider et al. |
| 2010/0114744 | A1 | 5/2010 | Gonen |
| 2011/0276604 | A1 | 11/2011 | Hom et al. |
| 2014/0310254 | A1 * | 10/2014 | Hom et al. ............ 707/705 |

OTHER PUBLICATIONS

Sofus A. Macskassy & Foster Provost, "Suspicion Scoring Based on Guilt-by-Association, Collective Inference, and Focused Data Access", 2005, International Conference on Intelligence Analysis, 6 pages.*

Josep M. Pujol et al., "Extracting Reputation in Multi Agent Systems by Means of Social Network Topology", AAMAS '02, Jul. 15-19, 2002, Bologna, Italy, Copyright 2002, pp. 467-474.

Donovan Artz et al., "A survey of trust in computer science and the Semantic Web", Web Semantics: Science, Services and Agents on the World Wide Web 5 (2007) pp. 58-71.

Eric Yuan et al., "Attributed Based Access Control (ABAC) for Web Services", Proceedins of the IEEE International Conference on Web Services (ICWS'05), 9 pages, (2005).

Li Yang et al., "Integrating Dirichlet Reputation into Usage Control", CSIIRW '09, Apr. 13-15, Oak Ridge, Tennessee, Copyright 2009, 14 pages.

Philip J. Windley, Ph.D., et al., "Using Reputation to Augment Explicit Authorization", DIM '07, Nov. 2, 2007, Fairfax, Virginia, Copyright 2007, pp. 72-81.

Hassan Takabi et al., "Trust-Based User-Role Assignment in Role-Based Access Control", IEEE AICCSA (2007), pp. 807-814.

Jason Crampton et al., "Towards an Access-Control Framework for Countering Insider Threats", Copyright 2010, pp. 173-195.

Jennifer Golbeck et al., "Accuracy of Metrics for Inferring Trust and Reputation in Semantic Web-Based Social Networks", 2004, Appearing in Engineering Knowledge in the Age of the Semantic Web, Springer-verlag Berlin Heidelberg Publisher, pp. 116-131.

Scott A. Waldron, USPTO Office Action, U.S. Appl. No. 12/775,410, Mail Date Jul. 17, 2012, 37 pages.

Scott A. Waldron, USPTO Final Office Action, U.S. Appl. No. 12/775,410, Mail Date Dec. 31, 2012, 31 pages.

Scott A. Waldron, USPTO Office Action, U.S. Appl. No. 12/775,410, Notification Date Nov. 15, 2013, 37 pages.

Scott A. Waldron, USPTO Final Office Action, U.S. Appl. No. 12/775,410, Notification Date Feb. 28, 2014, 22 pages.

Scott A. Waldron, USPTO Notice of Allowance and Fee(s) Due, U.S. Appl. No. 12/775,410, Date Mailed Mar. 26, 2014, 31 pages.

Frantz Coby, USPTO Notice of Allowance and Fee(s) Due, U.S. Appl. No. 12/815,431, Date Mailed Sep. 17, 2012, 9 pages.

Scott A. Waldron, USPTO Office Action, U.S. Appl. No. 14/315,397, Notification Date Oct. 7, 2014, 10 pages.

Scott A. Waldron, USPTO Notice of Allowance and Fee(s) Due, U.S. Appl. No. 14/315,397, Date Mailed Dec. 9, 2014, 7 pages.

Plecha, U.S. Appl. No. 14/315,545, Notice of Allowance Sep. 23, 2015, 22 pages.

* cited by examiner

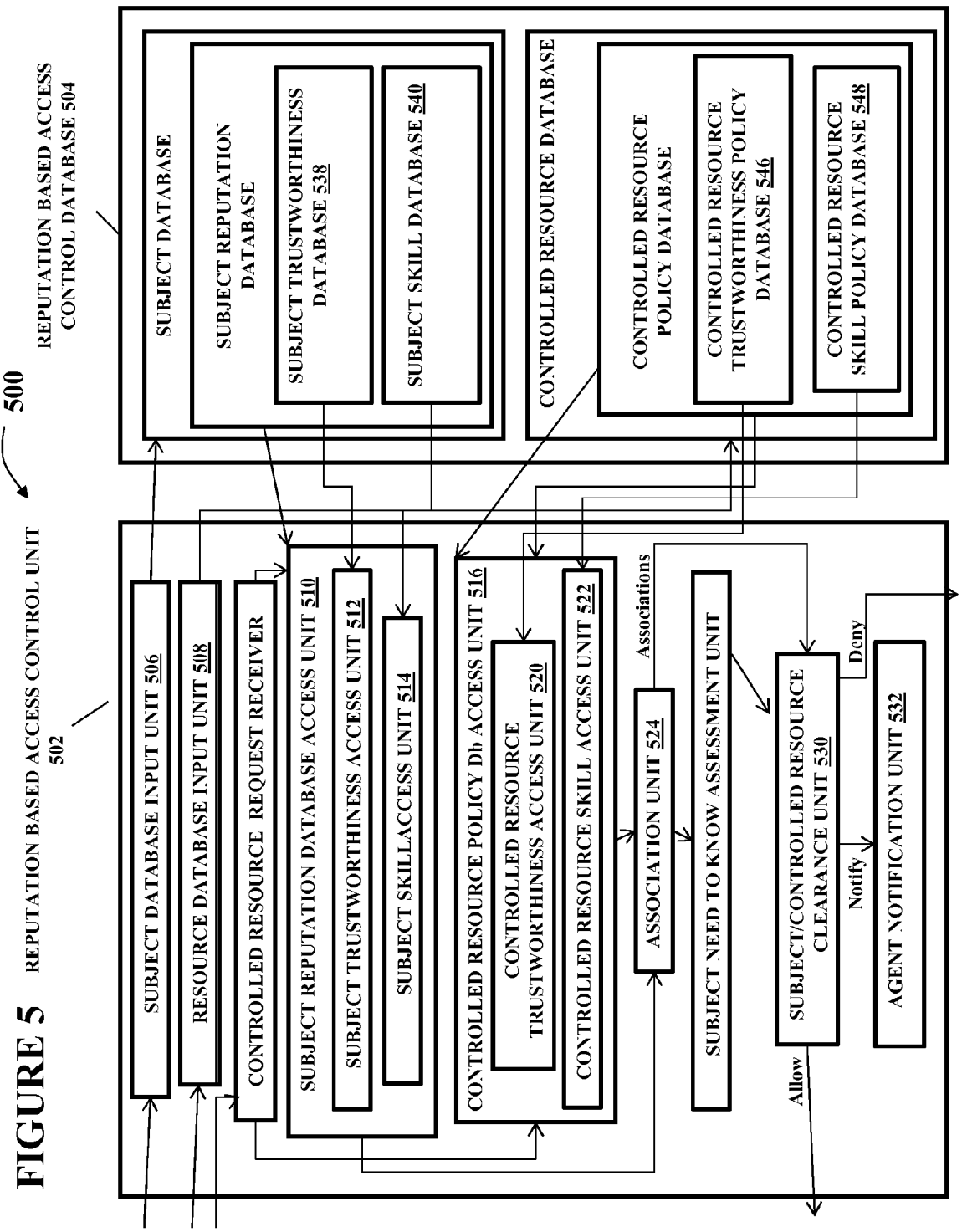
FIGURE 5   REPUTATION BASED ACCESS CONTROL DATABASE

REPUTATION BASED ACCESS CONTROL

RELATED U.S. APPLICATION DATA

This application is a continuation of, and claims the benefit of, co-pending and co-owned U.S. patent application Ser. No. 14/315,397, filed Jun. 26, 2014 (the entire contents of which are herein incorporated by reference), which is a continuation of the commonly owned U.S. patent application Ser. No. 12/775,400, filed May, 6, 2010, now U.S. Pat. No. 8,805,881, issued Aug. 12, 2014. This application is also related in some aspects to the commonly owned and issued U.S. Pat. No. 8,359,328, issued Jan. 22, 2013.

BACKGROUND

1. Field of the Invention

This invention relates generally to asset security, more specifically, to assessing security risks based on a combination of a rule based system and reputation metrics.

2. Description of the Related Art

When a subject (e.g., person, software, etc.) becomes a suspected security risk, enterprises may need to immediately suspend access of the suspected subject to controlled resources. These resources may be physical (e.g., buildings, vehicles, machinery, weapons, etc.) or virtual (e.g., web services, applications, etc.). A subject may become a suspected security risk for any number of reasons that may be assessed through the reputation of the subject. The following examples show cases where the reputation of the subject may be built and then used to determine whether the subject is a suspected security risk:

- If a subject is a known security risk, that subject's affiliates may become suspect. If the consequences are grave enough and the subject's security risks are high enough, the subject's affiliates or associates may immediately become suspect.
- Based the feedback of a peer A, subject's trust may need immediate re-evaluation.
- A subject may become a security risk if the subject's skill level in an area becomes diminished (e.g., subject is intoxicated).

The current solution is for a superior to evaluate each subject and to deny access based on a personal decision. This control does not happen instantaneously, is based on the superior's biases, and requires the superior to have access to a control system.

Therefore, there exists a need for a solution that solves at least one of the deficiencies of the related art.

SUMMARY OF THE INVENTION

Approaches for providing reputation based access control are provided. Specifically, at least one approach includes: identifying a requesting subject requesting access to a controlled resource; retrieving a reputation of the subject stored as a virtual attribute in a reputation-based access control database, the reputation comprising a value for skill for operating with the requested controlled resource; determining whether the subject is a known security risk; modifying a reputation of the subject and an associate in the case that a security risk of the subject meets a threshold; modifying the reputation of the subject based on at least one of: peer feedback and expert opinion, in the case that the subject is not a known security risk; retrieving a policy of the requested controlled resource; determining if the reputation of the subject meets the policy, and if so, allowing the subject access to the resource, and if not, denying the access.

One approach provides a method in a computer system having a network input/output (I/O), a central processing unit (CPU), a reputation based access control unit and one or more databases including a reputation based access control database, the method comprising: identifying a requesting subject that is requesting access to a controlled resource; retrieving a reputation of the requesting subject stored as a virtual attribute in the reputation-based access control database, wherein the reputation of the requesting subject comprises a value for skill for operating with the requested controlled resource; determining whether the requesting subject is a known security risk; modifying a reputation of an associate of the requesting subject and the reputation of the requesting subject in the case that a security risk of the requesting subject meets a threshold; modifying the reputation of the requesting subject based on at least one of: peer feedback and expert opinion, in the case that the requesting subject is not a known security risk; retrieving a policy of the requested controlled resource; determining if the reputation of the requesting subject meets the policy of the requested controlled resource; if the reputation of the requesting subject meets the policy of the requested controlled resource, allowing the requesting subject access to the requested controlled resource; and if the reputation of the requesting subject does not meet the policy of the requested controlled resource, denying the requesting subject access to the requested controlled resource.

Another approach provides a computer-readable storage device storing computer instructions, which, when executed, enables a computer system operating with a reputation based access control unit to provide reputation based access control, the computer-readable storage device storing computer instructions comprising: identifying a requesting subject that is requesting access to a controlled resource; retrieving a reputation of the requesting subject stored as a virtual attribute in the reputation-based access control database, wherein the reputation of the requesting subject comprises a value for skill for operating with the requested controlled resource; determining whether the requesting subject is a known security risk; modifying a reputation of an associate of the requesting subject and the reputation of the requesting subject in the case that a security risk of the requesting subject meets a threshold; modifying the reputation of the requesting subject based on at least one of: peer feedback and expert opinion, in the case that the requesting subject is not a known security risk; retrieving a policy of the requested controlled resource; determining if the reputation of the requesting subject meets the policy of the requested controlled resource; if the reputation of the requesting subject meets the policy of the requested controlled resource, allowing the requesting subject access to the requested controlled resource; and if the reputation of the requesting subject does not meet the policy of the requested controlled resource, denying the requesting subject access to the requested controlled resource.

Yet another approach provides a computer system for providing reputation based access control, the system comprising: a memory medium comprising instructions; a bus coupled to the memory medium; and a processor coupled to the bus that when executing the instructions causes the computer system to: identify a requesting subject that is requesting access to a controlled resource; retrieve a reputation of the requesting subject stored as a virtual attribute in the reputation-based access control database, wherein the reputation of the requesting subject comprises a value for skill for operating with the requested controlled resource; determine whether the requesting subject is a known security risk;

modify a reputation of an associate of the requesting subject and the reputation of the requesting subject in the case that a security risk of the requesting subject meets a threshold; modify the reputation of the requesting subject based on at least one of: peer feedback and expert opinion, in the case that the requesting subject is not a known security risk; retrieve a policy of the requested controlled resource; determine if the reputation of the requesting subject meets the policy of the requested controlled resource; if the reputation of the requesting subject meets the policy of the requested controlled resource, allow the requesting subject access to the requested controlled resource; and if the reputation of the requesting subject does not meet the policy of the requested controlled resource, deny the requesting subject access to the requested controlled resource.

BRIEF DESCRIPTION OF THE DRAWINGS

These and other features of this invention will be more readily understood from the following detailed description of the various aspects of the invention taken in conjunction with the accompanying drawings in which:

FIG. 5 illustrates one embodiment of the reputation based access control system of the present invention having a reputation based access control unit and a reputation based access control database.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The present invention, which meets the needs identified above, is a method and system for reputation based access control for accessing requested controlled resources by requesting subjects based upon the reputation of the requesting subject and the requested controlled resource's access policy.

Figure 1:
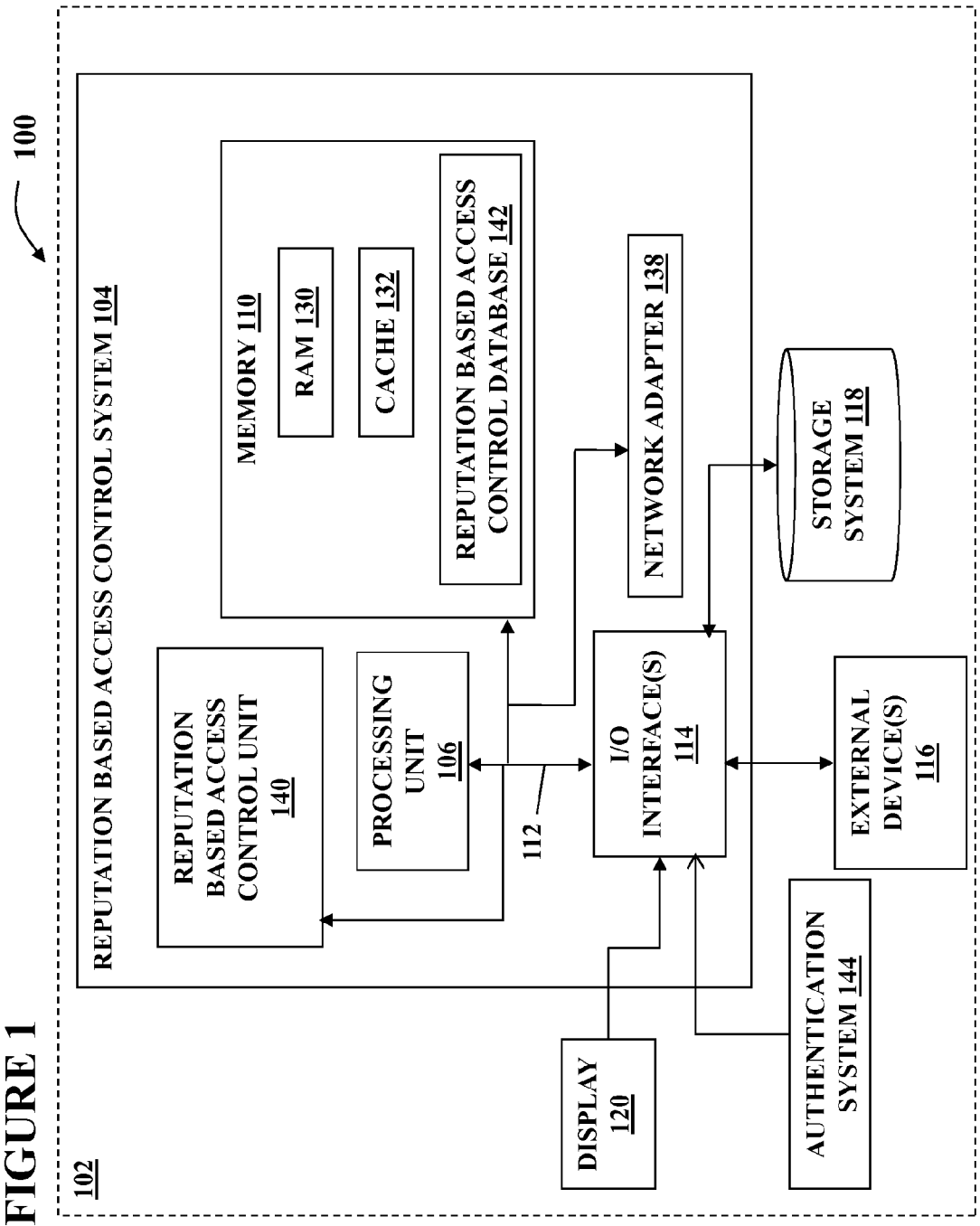
FIG. 1 shows a data processing system suitable for implementing an embodiment a reputation based access control system of the present of the present invention.

A data processing system 100, such as computer system 102 shown in FIG. 1, suitable for storing and/or executing program code of the present invention may include a reputation based access control system 104 having at least one processor (processing unit 106) coupled directly or indirectly to memory 110 through a system bus 112. Memory 110 can include local memory (RAM 130) employed during actual execution of the program code, bulk storage (storage 118), and cache memories (cache 132) that provide temporary storage of at least some program code in order to reduce the number of times code must be retrieved from bulk storage 118 during execution. It may also include a reputation based access control database 142 for storing reputation information of subjects. Input/output or I/O devices (external devices 116) (including but not limited to keyboards, displays (display 120), pointing devices, etc.) can be coupled to the system either directly or through intervening I/O controllers (I/O interface(s) 114). A reputation based access control unit 140 may also be coupled to system bus 112.

This system utilizes an authentication system 144 (biometric, challenge/response, etc.) to identify a subject. Once the identity is determined, access to a resource is determined by reputation based access control unit 140. (The determination of the resource may involve door locks, computer menus, etc.). The system uses predetermined associations between the resource and security (e.g., trustworthiness) contexts to determine the subject's reputation in those contexts. The system then interfaces with a reputation assessment system (such as reputation based access control unit 140) to gauge the subject's reputation in these contexts. If the subject's reputation (as stored in reputation based access control database 142) meets the predetermined limits for reputation in those contexts for that resource (as stored in reputation based access control database 142), the subject is allowed access to the resource. Otherwise access is denied and the proper agents are notified.

Figure 2:
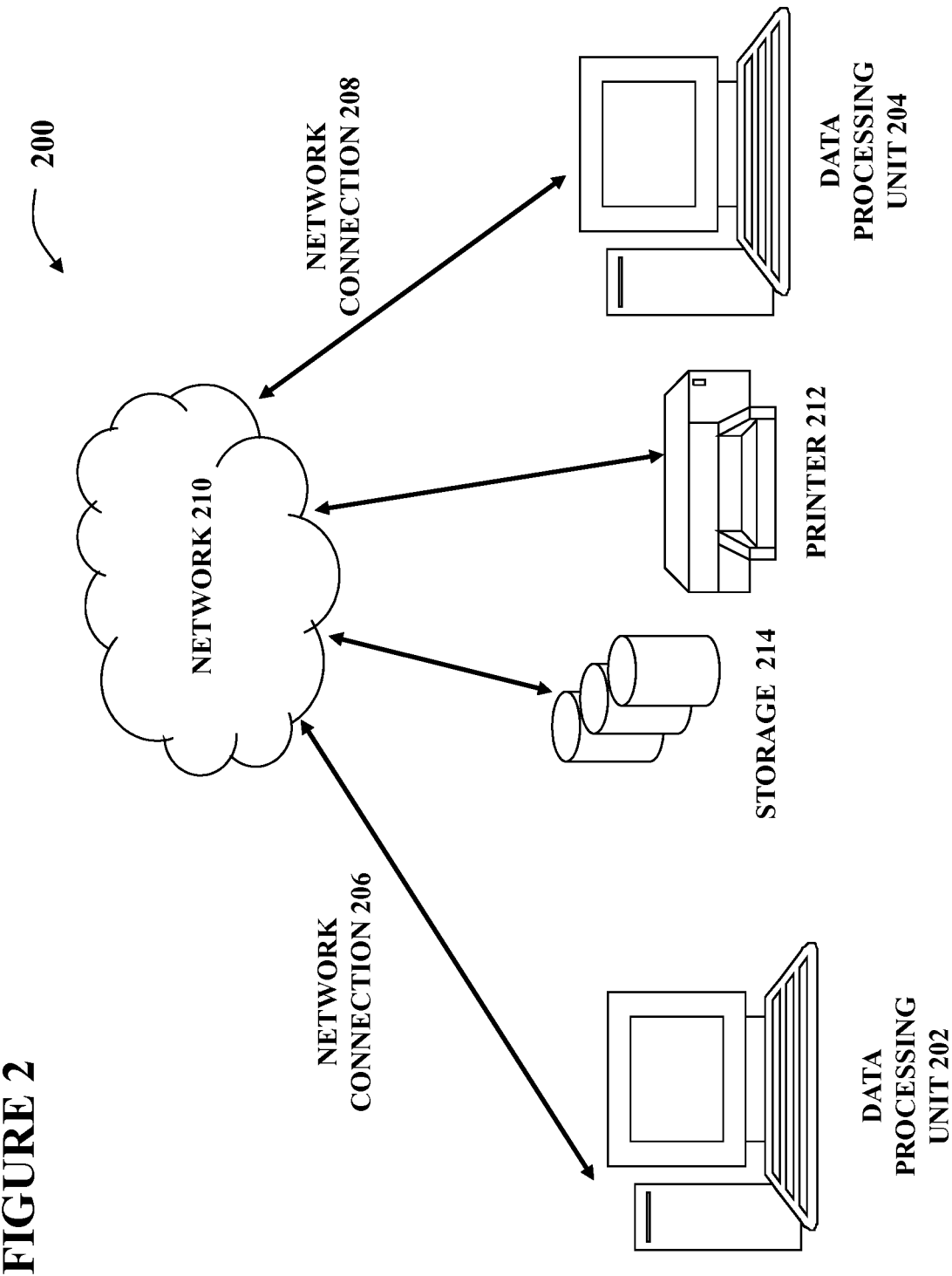
FIG. 2 shows a network that would work with an embodiment of the present invention.

Network adapters (network adapter 138) may also be coupled to the system 200 to enable the data processing system (as shown in FIG. 2, data processing unit 202) to become coupled through network connections (network connections 206, 208) to other data processing systems (data processing unit 204), remote printers (printer 212) and/or storage devices (storage 214) or other devices through intervening private and/or public networks (network 210).

Figure 3:
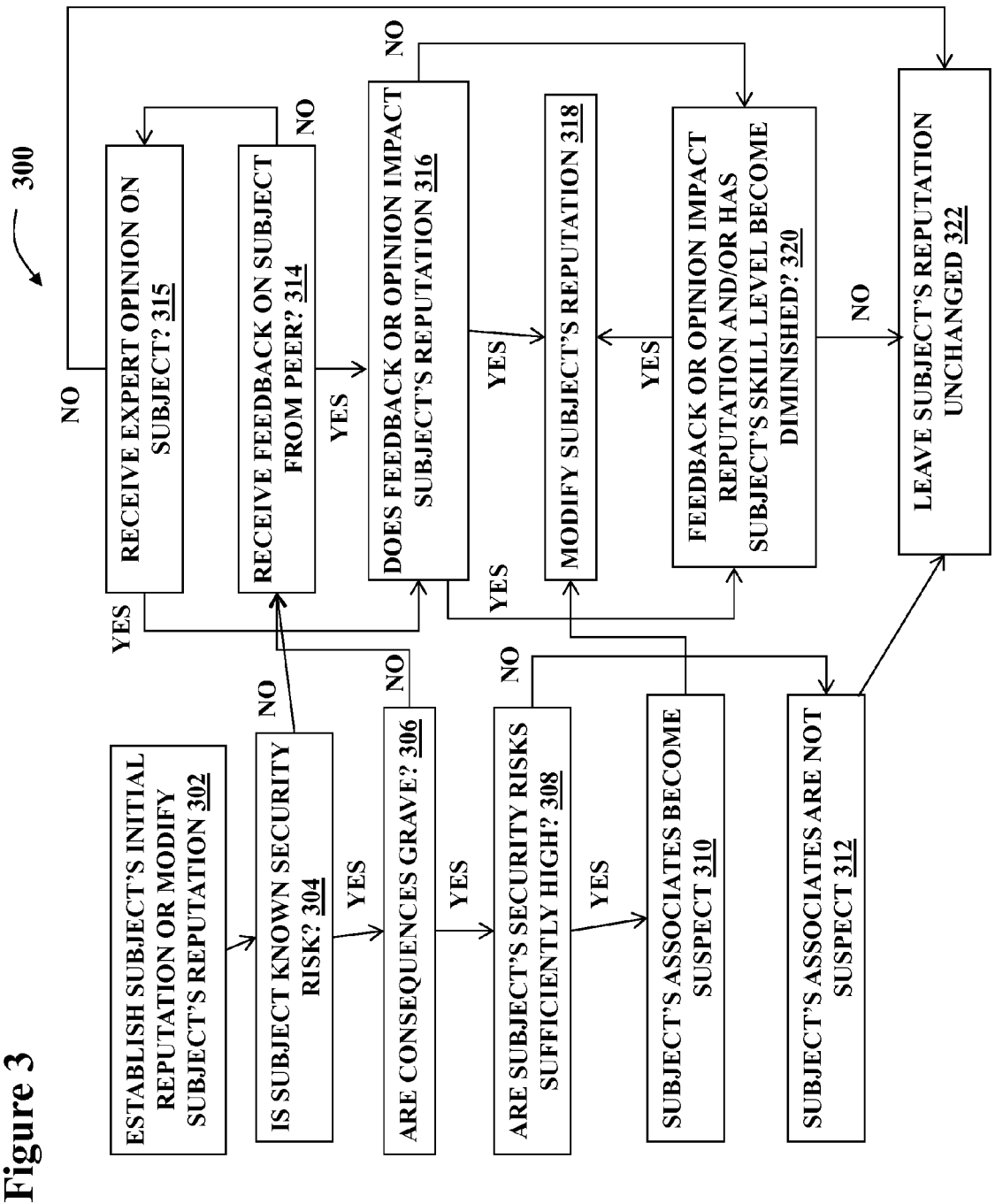
FIG. 3 illustrates one embodiment of a method for the establishment and subsequent modification of a subject's reputation in a reputation based access control system.

FIG. 3 illustrates one embodiment of a method 300 of the present invention for the establishment and subsequent modification, if necessary, of a subject's reputation information in a reputation based access control system. For purposes of this document, a "subject" may be a person, a device, software or anything that can request access to a system resource. "Subject reputation information" may be information, or data relating to the subject, such as attributes, characteristics, history (prior actions), associates, associates' history, aspects, traits, character, etc., and may be grouped into categories such as trustworthiness and skill level but there may be others as well. A "resource", for purposes of this document, may be a data item, a building or any other resource that may need to have controlled access. A "controlled resource" may be a resource that has an access policy for accessing the resource. At 302, the subject's reputation information may initially be established and subsequently be modified. Furthermore, the present invention can provide for more of a simultaneous assessment of multiple reputation factors than a stepwise decision tree. For example, a policy might state that if the person has a clearanceReputation>Secret AND skillReputation>Expert AND peerTrust>Honest, then the subject may access the controlled resource. If access is denied because the person was trying to do something unauthorized, then that person's trust score might be diminished. At 304, it is determined whether the subject is a known security risk and, if so, it is determined whether the consequences are grave at 306. Examples of consequences being grave may be that access to a requested resource by a known security risk (e.g., access to highly confidential information, such as customer lists, "secret formulas", "black box" projects located within buildings, by a subject who is a known security risk may cause irreparable damage to a company or enterprise) may cause extensive damage to a company or resource owner. If such consequences are grave, it is determined whether the subject's security risks are sufficiently high as compared to the possible consequences at 308 and, if so, subject's associates become suspect at 310 and, at 318, the subject's reputation is modified to indicate that subject's associates have become suspect. If not, at 312, the subject's reputation remains unchanged at 322.

If, at 304, subject is determined to not be a security risk, it is determined whether feedback has been received from a peer of the subject as to, e.g., the subject's skill or trustworthiness, at 314. If feedback from a peer has been received, it is evaluated and determined, at 316, whether the feedback impacts the reputation of the subject. If so and it relates to skill, it is determined whether the subject's skill level has been diminished at 320. If so, the subject's reputation is modified at 318. If not, the subject's reputation remains unchanged at 322. If, at 316, it is determined that the feedback impacts the reputation of the subject and it does not relate to skill, the subject's reputation is modified at 318 and stored. If, at 314, it is determined that no feedback from a peer has been received, it is determined, at 315, whether an expert opinion on the subject has been received and, if not, the subject's reputation remains unchanged at 322. If so, it is determined, at 316, whether the expert opinion impacts the reputation of the subject. If not, the subject's reputation remains unchanged at 322. If, at 316, it is determined that the expert opinion impacts the reputation of the subject, the subject's reputation is modified at 318 and stored.

It should be noted that information related to the subject's reputation, e.g., the subject's associates, subject's security risk, consequences, etc., may be stored in databases in the reputation based access control system shown in FIG. 1 and the processing of that information may be performed in the reputation based access control system shown in FIG. 1.

Figure 4:
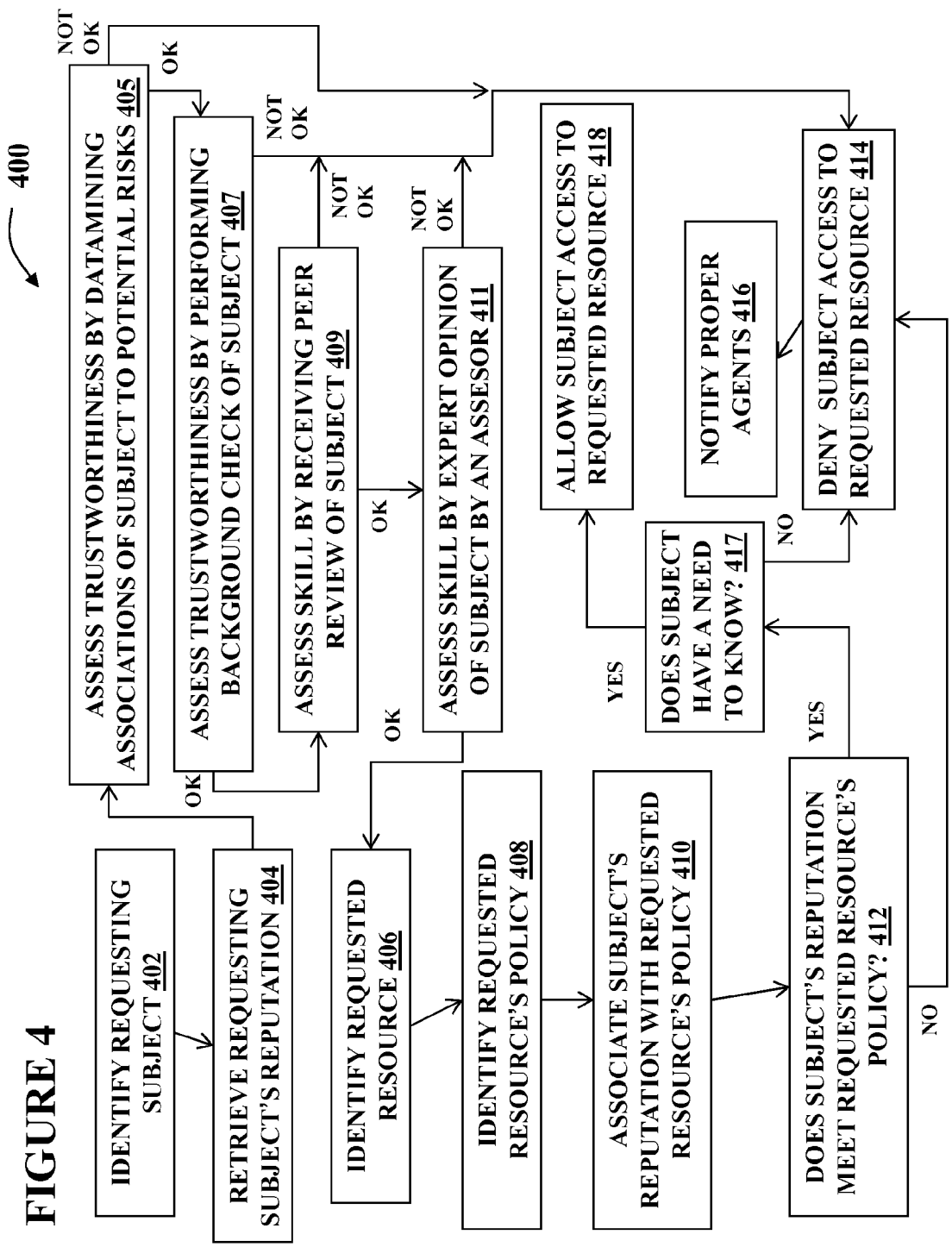
FIG. 4 illustrates one embodiment of a method of the present invention in a reputation based access control system for determining whether a requesting subject may or may not have access to a requested controlled resource.

FIG. 4 illustrates one embodiment of a method 400 of the present invention in a reputation based access control system for determining whether a requesting subject may or may not have access to a controlled resource. At 402, a requesting subject is identified and, at 404, the requesting subject's reputation is retrieved. At 405, the trustworthiness of the requesting subject is assessed by data mined associations of the requesting subject and evaluating that assessment using association policies. If the assessment is positive, that is, the trustworthiness value of the requesting subject based upon the data mining of requesting subject's associations exercise is acceptable, or "OK", at 407, the trustworthiness of the requesting subject is assessed by performing a background check of the requesting subject. If the assessment is positive, that is, the trustworthiness value of the requesting subject based upon the background check of the requesting subject is acceptable, or "OK", at 409, the skill of the requesting subject is assessed by reviewing and evaluating a peer review of the requesting subject. If the assessment is positive, that is, the skill value of the requesting subject based upon the peer review of the requesting subject is acceptable, or "OK", at 411, the skill of the requesting subject is assessed by examining an expert opinion by an assessor of the requesting subject's skill level. If the assessment is positive, that is, the skill value of the requesting subject based upon an expert opinion performed digitally by an assessor of the requesting subject is acceptable, or "OK", at 406, the requested controlled resource is identified. If at 405, 407, 409 or 411, the trustworthiness or skill values of the requesting subject are not acceptable, or "NOT OK", at 414, the requesting subject is denied access to the requested controlled resource, the requesting subject's reputation information may be updated and the proper agents are notified at 416.

It should be noted that the assessment of trustworthiness by data mining associations of the requesting subject and the assessment of trustworthiness by performing a background check of the requesting subject may be done in parallel rather than the serial manner that is illustrated in FIG. 4, one assessment may be conducted and not the other, or it may be that neither is conducted. It should be noted that the digital on-line background checks performed by the present invention do not replace the types of background checks performed by intelligence organizations. They actually supplement them. In fact, a national security background check could be another reputation point. Likewise, the assessment of skill by reviewing, assessing and evaluating a peer review of the requesting subject and the assessment of skill by reviewing, assessing and evaluating an expert opinion of the requesting subject may be done in parallel rather than the serial manner that is illustrated in FIG. 4, one assessment may be conducted and not the other, or it may be that neither is conducted. Also, trustworthiness assessment may be conducted on other information relating to the requesting subject such as the requesting subject's or the requesting subject's associations' actions. Likewise, skill assessment may be conducted on other information relating to the requesting subject, such as whether the requesting subject is impaired, such that access to the requested controlled object may be denied.

At 406, the requested controlled resource is identified and, at 408, its access policy is retrieved. At 410, the requesting subject's reputation information is associated with the requested controlled resource's access policy. At 412, it is determined whether the requesting subject's reputation information meets the requested controlled resource's access policy and, if so, at 417, it is determined as to whether the requesting subject has a "need to know" as requesting subject relates to the requested controlled resource. If the requesting subject has a "need to know" as the requesting subject relates to the requested controlled resource, at 418, the requesting subject is allowed to access the requested controlled resource. If, at 412, it is determined that the requesting subject's reputation information does not meet the requested controlled resource's access policy or, at 417, it is determined that the requesting subject does not have a "need to know" as requesting subject relates to the requested controlled resource, at 414, the requesting subject is denied access to the requested controlled resource, the requesting subject's reputation information may be updated and the proper agents are notified at 416.

FIG. 5 illustrates one embodiment of the reputation based access control system 500 of the present invention having a reputation based access control unit 502 and a reputation based access control database 504. Reputation based access control unit 502 may have a subject database input unit 506 for receiving reputation information relating to subjects and for storing the reputation information relating to subjects in reputation based access control database 504. The inputs may be received from outside reputation based access control system 500, e.g., by a subject's superior, or from within reputation based access control system 500 based upon analysis conducted within reputation based access control system 500. The input may be initial inputs for each subject's reputation or modifications to each subject's reputation. Reputation based access control unit 502 may further have a resource database input unit 508 for receiving access policy information relating to controlled resources and for storing in reputation based access control database 504. The inputs may be received from outside reputation based access control system 500, e.g., by a controlled resource owner, or from within reputation based access control system 500 based upon analysis conducted within reputation based access control system 500. The input may be initial access policy inputs for each controlled resource or modifications to each controlled resource's access policy. An example of subject reputation information, or data, may be information (such as criminal background of subject or subject's associations, subject's or subject's associations' previous actions, etc.) relating to each subject's level of trustworthiness for security purposes that may be determined by such methods as data mining relating to each subject or by doing a background check on the subject. Other methods may be used as well. Another example of subject reputation information may be information relating to each subject's skill level (skill history, subject's or subject's associations' previous actions, etc.) for determining capabilities of the subject that may be determined by such methods as reviewing/analyzing peer reviews related to the subject or reviewing/analyzing expert opinions related to the subject. Other methods may be used as well.

Reputation based access control unit 502 may further have a subject database access unit 510 for retrieving reputation information relating to subjects from reputation based access control database 504. Subject database access unit 510 may have subject trustworthiness access unit 512 for retrieving trustworthiness information relating to subjects from subject trustworthiness database 538 in reputation based access control database 504 and subject skill access unit 514 for retrieving skill information relating to subjects from subject skill database 540 in reputation based access control database 504.

Reputation based access control unit 502 may further have a controlled resource access policy database access unit 516 for retrieving access policy information relating to controlled resources from reputation based access control database 504. Controlled resource policy database access unit 516 may have controlled resource trustworthiness policy access unit 520 for retrieving access policies of controlled resources and trustworthiness information from controlled resource trustworthiness policy database 546 in reputation based access control database 504 and controlled resource skill policy access unit 522 for retrieving skill level access policy information for each controlled resource from controlled resource skill policy database 548 in reputation based access control database 504.

Reputation based access control unit 502 may further have a requesting subject/requested controlled resource access policy association unit 524. Requesting subject/requested controlled resource access policy association unit 524 associates requesting subject reputation information with requested controlled resource access policy and passes this information to requesting subject/requested controlled resource policy clearance unit 530. Requesting subject/requested controlled resource policy clearance unit 530 examines and analyzes the requesting subject/requested controlled resource access policy associations and allows or denies access to the controlled resource based upon the analysis. Upon denial, it may also notify agents via agent notification unit 532.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for reputation based access control for accessing requested controlled resources by requesting subjects based upon the reputation of the requesting subject and the requested controlled resource's access policy, it is understood that the invention further provides various alternative embodiments. For example, in one embodiment, the invention provides a computer-readable/useable medium that includes computer program code to enable a system for accessing requested controlled resources by requesting subjects based upon the reputation of the requesting subject and the requested controlled resource's access policy, To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for reputation based access control for accessing requested controlled resources by requesting subjects based upon the reputation of the requesting subject and the requested controlled resource's access policy. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a Solution Integrator, could offer to deploy a computer infrastructure for reputation based access control for accessing requested controlled resources by requesting subjects based upon the reputation of the requesting subject and the requested controlled resource's access policy. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method in a computer system having a network input/output (I/O), a central processing unit (CPU), a reputation based access control unit and one or more databases including a reputation based access control database, the method comprising:
   identifying a requesting subject that is requesting access to a controlled resource;
   retrieving a reputation of the requesting subject stored as a virtual attribute in the reputation-based access control database, wherein the reputation of the requesting subject comprises a value for skill for operating with the requested controlled resource;
   determining whether the requesting subject is a known security risk;
   modifying a reputation of an associate of the requesting subject and the reputation of the requesting subject in the case that the requesting subject is a known security risk and the security risk of the requesting subject meets a threshold;
   modifying the reputation of the requesting subject based on peer feedback indicating that the requesting subject's value for skill is diminished, in the case that the requesting subject is not a known security risk;
   retrieving a policy of the requested controlled resource;
   determining if the reputation of the requesting subject meets the policy of the requested controlled resource;
   if the reputation of the requesting subject meets the policy of the requested controlled resource, allowing the requesting subject access to the requested controlled resource; and
   if the reputation of the requesting subject does not meet the policy of the requested controlled resource, denying the requesting subject access to the requested controlled resource.

2. The method as defined in claim 1, the modifying the reputation of the requesting subject based on peer feedback indicating that the requesting subject's value for skill is diminished further comprising, determining if expert opinion impacts the reputation of the requesting subject, and modifying the reputation of the requesting subject in the case that the reputation is impacted.

3. The method as defined in claim 1, wherein the reputation of the requesting subject further comprises a value for trustworthiness, the method further comprising assessing the trustworthiness of the requesting subject.

4. The method as defined in claim 3, further comprising, determining the value for trustworthiness of the requesting subject by data mining associations of the requesting subject and performing a background check of the requesting subject.

5. The method as defined in claim 3, further comprising, determining the value for trustworthiness of the requesting subject by assessing actions previously taken by the requesting subject.

6. The method as defined in claim 3, further comprising, determining the value for trustworthiness of the requesting subject by assessing actions previously taken by associates of the requesting subject.

7. The method as defined in claim 1, the method further comprising, assessing the skill of the requesting subject.

8. The method as defined in claim 7, further comprising, determining the value for skill of the requesting subject by assessing actions previously taken by the requesting subject.

9. A computer-readable hardware storage device storing computer instructions, which, when executed, causes a computer system operating with a reputation based access control unit to provide reputation based access control, the computer-readable storage device storing computer instructions comprising:
   identifying a requesting subject that is requesting access to a controlled resource;
   retrieving a reputation of the requesting subject stored as a virtual attribute in the reputation-based access control database, wherein the reputation of the requesting subject comprises a value for skill for operating with the requested controlled resource;
   determining whether the requesting subject is a known security risk;
   modifying a reputation of an associate of the requesting subject and the reputation of the requesting subject in the case that the requesting subject is a known security risk and the security risk of the requesting subject meets a threshold;
   modifying the reputation of the requesting subject based on peer feedback indicating that the requesting subject's value for skill is diminished, in the case that the requesting subject is not a known security risk;
   retrieving a policy of the requested controlled resource;
   determining if the reputation of the requesting subject meets the policy of the requested controlled resource;
   if the reputation of the requesting subject meets the policy of the requested controlled resource, allowing the requesting subject access to the requested controlled resource; and
   if the reputation of the requesting subject does not meet the policy of the requested controlled resource, denying the requesting subject access to the requested controlled resource.

10. The computer-readable hardware storage device of claim 9, the modifying the reputation of the requesting subject based on peer feedback indicating that the requesting subject's value for skill is diminished further comprising, determining if expert opinion impacts the reputation of the requesting subject, and modifying the reputation of the requesting subject in the case that the reputation is impacted.

11. The computer-readable hardware storage device of claim 9, wherein the reputation of the requesting subject further comprises a value for trustworthiness, the computer instructions further comprising assessing the trustworthiness of the requesting subject.

12. The computer-readable hardware storage device of claim 11, the computer instructions further comprising determining the value for trustworthiness of the requesting subject by data mining associations of the requesting subject and performing a background check of the requesting subject.

13. The computer-readable hardware storage device of claim 11, the computer instructions further comprising determining the value for trustworthiness of the requesting subject by assessing actions previously taken by one or more of the following: the requesting subject, and associates of the requesting subject.

14. The computer-readable hardware storage device of claim 9, the computer instructions further comprising determining a value for skill of the requesting subject by assessing actions previously taken by the requesting subject.

15. A computer system for providing reputation based access control, the system comprising:
   a memory medium comprising instructions;
   a bus coupled to the memory medium; and a processor coupled to the bus that when executing the instructions causes the computer system to:

identify a requesting subject that is requesting access to a controlled resource;

retrieve a reputation of the requesting subject stored as a virtual attribute in the reputation-based access control database, wherein the reputation of the requesting subject comprises a value for skill for operating with the requested controlled resource;

determine whether the requesting subject is a known security risk;

modify a reputation of an associate of the requesting subject and the reputation of the requesting subject in the case that the requesting subject is a known security risk and the security risk of the requesting subject meets a threshold;

modify the reputation of the requesting subject based on peer feedback indicating that the requesting subject's value for skill is diminished, in the case that the requesting subject is not a known security risk;

retrieve a policy of the requested controlled resource;

determine if the reputation of the requesting subject meets the policy of the requested controlled resource;

if the reputation of the requesting subject meets the policy of the requested controlled resource, allow the requesting subject access to the requested controlled resource; and if the reputation of the requesting subject does not meet the policy of the requested controlled resource, deny the requesting subject access to the requested controlled resource.

16. The computer system of claim 15, the instructions further causing the computer to determine if expert opinion impacts the reputation of the requesting subject, and modify the reputation of the requesting subject in the case that the reputation is impacted.

17. The computer system of claim 15, wherein the reputation of the requesting subject further comprises a value for trustworthiness, the instructions further causing the computer to assess the trustworthiness of the requesting subject.

18. The computer system of claim 17, the instructions further causing the computer to determine the value for trustworthiness of the requesting subject by data mining associations of the requesting subject and performing a background check of the requesting subject.

19. The computer system of claim 17, the instructions further causing the computer to determine the value for trustworthiness of the requesting subject by assessing actions previously taken by one or more of the following: the requesting subject, and associates of the requesting subject.

20. The computer system of claim 15, the instructions further causing the computer to determine a value for skill of the requesting subject by assessing actions previously taken by the requesting subject.

* * * * *